United States Patent [19]

Armstrong et al.

[11] Patent Number: 4,630,749

[45] Date of Patent: Dec. 23, 1986

[54] FUEL FILL TUBE WITH VAPOR VENT AND OVERFILL PROTECTION

[75] Inventors: Donald J. Armstrong, Troy; Roy A. Giacomazzi, Washington Township, Macomb County; George W. Niepoth, Milford, all of Mich.

[73] Assignee: General Motors Corporation, Detroit, Mich.

[21] Appl. No.: 840,871

[22] Filed: Mar. 18, 1986

[51] Int. Cl.$^4$ .............................................. B65D 31/06
[52] U.S. Cl. ............................. 220/86 R; 220/85 VR; 220/85 VS; 220/86 AT; 141/59
[58] Field of Search ............... 220/86 R, 86 AT, 85 F, 220/85 S, 85 VR, 85 VS, 360, 373, DIG. 33; 141/51, 59, 325, 326, 349

[56] References Cited

U.S. PATENT DOCUMENTS

| | | | |
|---|---|---|---|
| 3,358,871 | 12/1967 | Leichner | 220/86 R |
| 3,465,911 | 9/1969 | Colarusso et al. | 220/86 AT |
| 3,946,771 | 3/1976 | Braun et al. | 141/59 |
| 4,060,108 | 11/1977 | Weston et al. | 141/59 |
| 4,441,533 | 4/1984 | Snyder | 141/59 |

*Primary Examiner*—Steven M. Pollard
*Attorney, Agent, or Firm*—Donald F. Scherer

[57] ABSTRACT

A fuel fill tube for a vehicle fuel tank has a canister vapor vent, a shut-off valve and an overfill protection valve. The overfill valve prevents liquid from communicating with the carbon canister during overfill and communicates the liquid to the atmospheric open end of the fill tube.

3 Claims, 5 Drawing Figures

FUEL FILL TUBE WITH VAPOR VENT AND OVERFILL PROTECTION

BACKGROUND OF THE INVENTION

This invention relates to fuel fill tubes and more particularly to vapor venting during refueling.

SUMMARY OF THE INVENTION

It is an object of this invention to provide an improved fuel tank fill tube wherein a flap valve, opened by the fuel nozzle, has a finger element which opens a shut-off valve to permit fuel vapors to be ported to a charcoal canister on the vehicle.

It is another object of this invention to provide an improved fuel fill tube wherein a shut-off valve is actuated by insertion of a fuel nozzle into the fill tube to permit fuel vapors to be ported to a charcoal canister and wherein a float valve prevents liquid fuel from communicating with the canister in the event of tank overfill.

It is a further object of this invention to provide an improved fuel fill tube for a fuel tank wherein a flap valve is opened by a nozzle and has disposed thereon a finger element which is operable to actuate a shut-off valve to permit communication of fuel vapors with a charcoal canister and also wherein liquid overfill protection is provided through a float valve which prevents liquid fuel from entering the canister and an overfill passage which directs excess liquid to the open end of the fill tube.

These and other objects and advantages of the present invention will be more apparent from the following specification and drawings.

DESCRIPTION OF THE EMBODIMENTS

Figure 1:
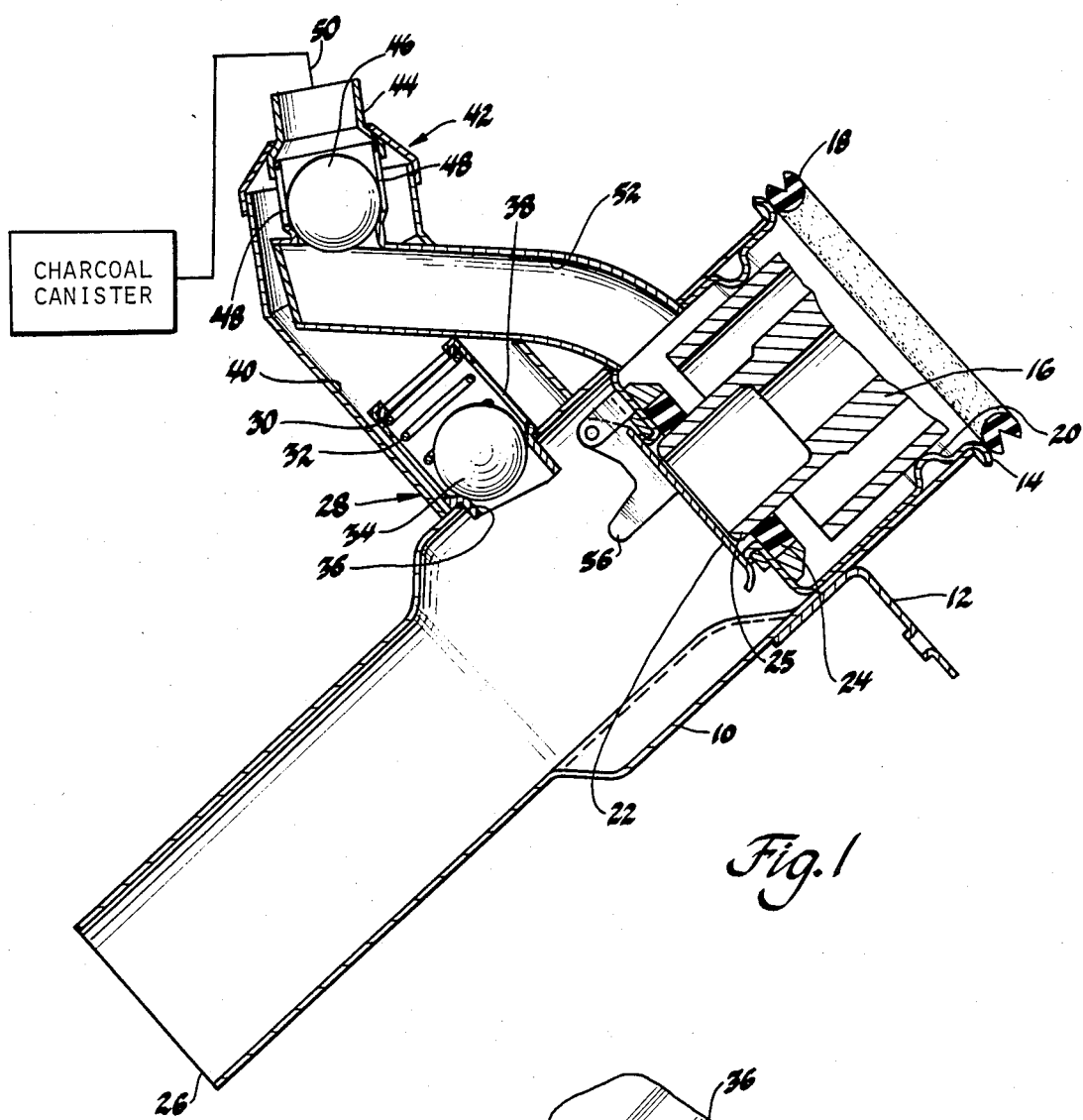
FIG. 1 is a cross-sectional elevational view of a fuel fill tube incorporating the present invention.

In FIG. 1 there is seen a fill tube 10 which has secured thereto a mounting bracket 12 adapted to be secured to a vehicle, not shown. The attachment between the fill tube and the vehicle is conventional and a description thereof is not believed necessary for an understanding of this invention.

The fill tube 10 has an open end 14 which can communicate with the atmosphere when a fuel cap 16 and its accompanying seal 18 are removed. The fuel cap 16 may be constructed in accordance with U.S. Pat. No. 4,458,824 issued to Baker et al. July 10, 1984, and the seal 18 may be constructed in accordance with U.S. Pat. No. 4,065,026 issued to Williams et al. Dec. 27, 1977. These structures are well-known such that a more complete description is not believed necessary herein.

The fill tube 10 has an insert 20 in which the fuel cap 16 is installed. This insert has mounted thereon a spring flap or trap door 22 which is adapted to close the fill tube opening. A ring seal 24 engages the outer diameter of an extension 25 on the fuel cap 16 to provide a seal arrangement when the cap is installed.

The fill tube 10 has an open end 26 which opens to the interior of the fuel tank, not shown. A shut-off valve, generally designated 28, is disposed in the fill tube 10 at a location spaced between the spring flap 22 and the open end 26. The shut-off valve 28 is comprised of a housing 30, a spring 32 and a ball 34. The ball 34 is pressed against a seat 36 formed in the housing 30 by the spring 32. The housing 30 has formed therein a plurality of passages 38 which permit communication between the housing 30 and a passage structure 40.

The passage structure 40 has secured therein an overfill protection valve, generally designated 42, which includes a housing 44 and a ball or float element 46. The housing 44 has formed therein a plurality of passages 48 which permit communication between the passage structure 40 and a charcoal canister passage 50. The charcoal canister passage 50 is connected with a conventional charcoal canister disposed elsewhere in the vehicle. As is well-known, such canister elements store fuel vapors until such vapors are utilized in engine operation. The housing 44 is secured in an overfill protection passage 52 which communicates with the inner space of insert 20 such that, as seen in FIG. 3, this passage will be open to the atmosphere when the fuel cap 16 is removed.

Figure 3:
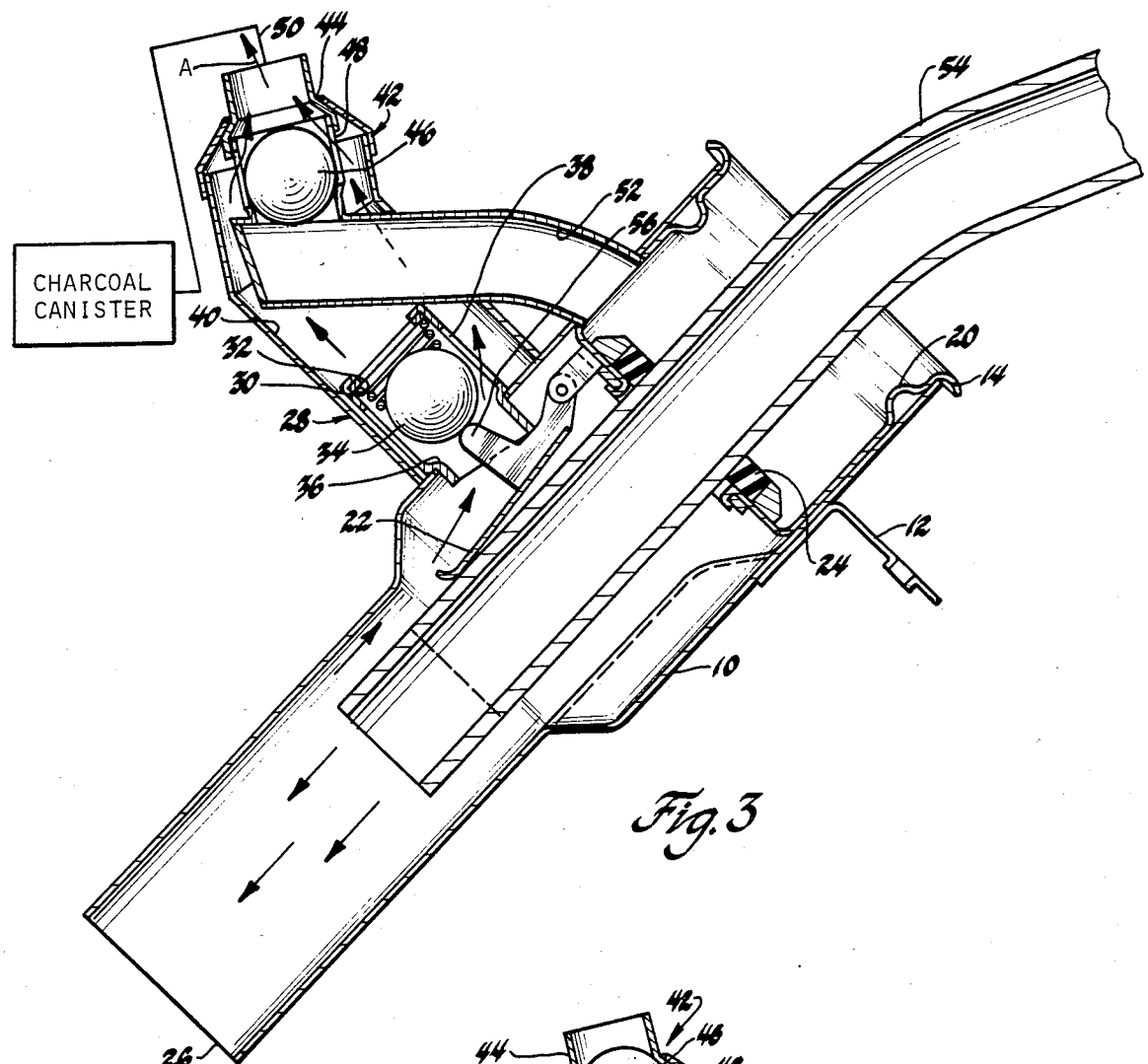
FIG. 3 is a sectional elevational view of the fill tube with a fuel nozzle inserted during refilling.
Figure 4:
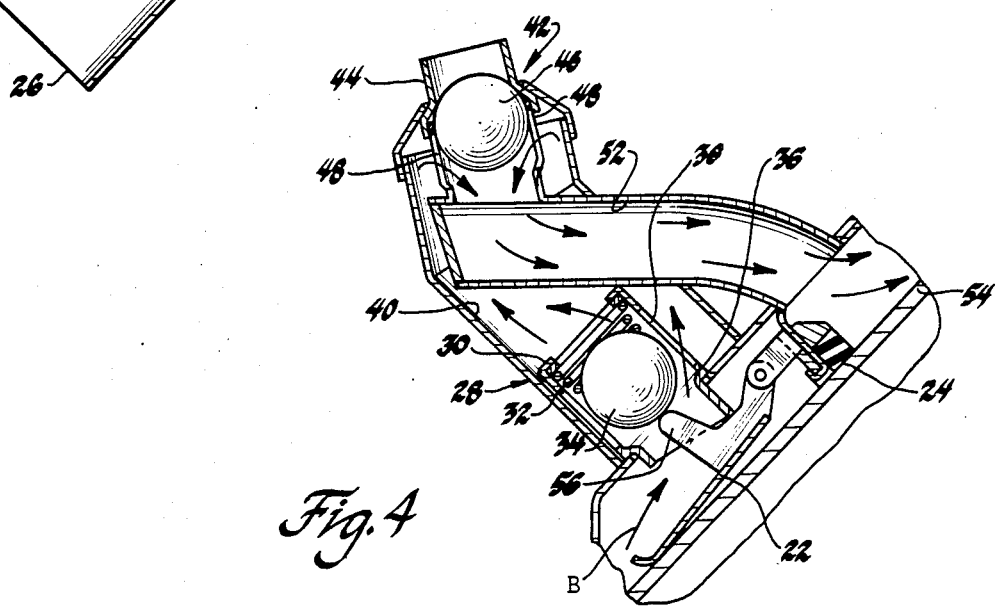
FIG. 4 is a partial sectional view similar to FIG. 3 describing liquid handling during overfill.

During refueling, a fuel nozzle 54, as seen in FIGS. 3 and 4, is inserted through the seal 24 and operates to open the spring flap 22. The spring flap 22 has secured thereto a finger element 56 which abuts the ball 34 so as to open the valve 28. With the valve 28 open, fuel vapors depicted by Arrow A are permitted to flow through the openings 38, passage 40 and openings 48 to the charcoal canister. The seal 24 sealingly engages the outer surface of the fuel fill nozzle 54 such that fuel vapors will not escape to atmosphere.

If the automatic shut-off mechanism of the fuel nozzle 54 is inoperable or slow to operate, liquid fuel depicted by Arrows B in FIG. 4 will pass through the shut-off valve 28. When the liquid fuel contacts the ball 46, the ball 46 will be urged into sealing engagement with the housing 44 adjacent the passage 50 thereby preventing liquid from passing to or otherwise communicating with the charcoal canister. The liquid fuel will pass through the openings 48 and into the passage 52, which has been unsealed by the ball 46. The liquid fuel in passage 52 is communicated to the inner space of insert 20 from which it will pass to atmosphere to provide the operator with a warning that fuel overfill is occurring.

Figure 2:
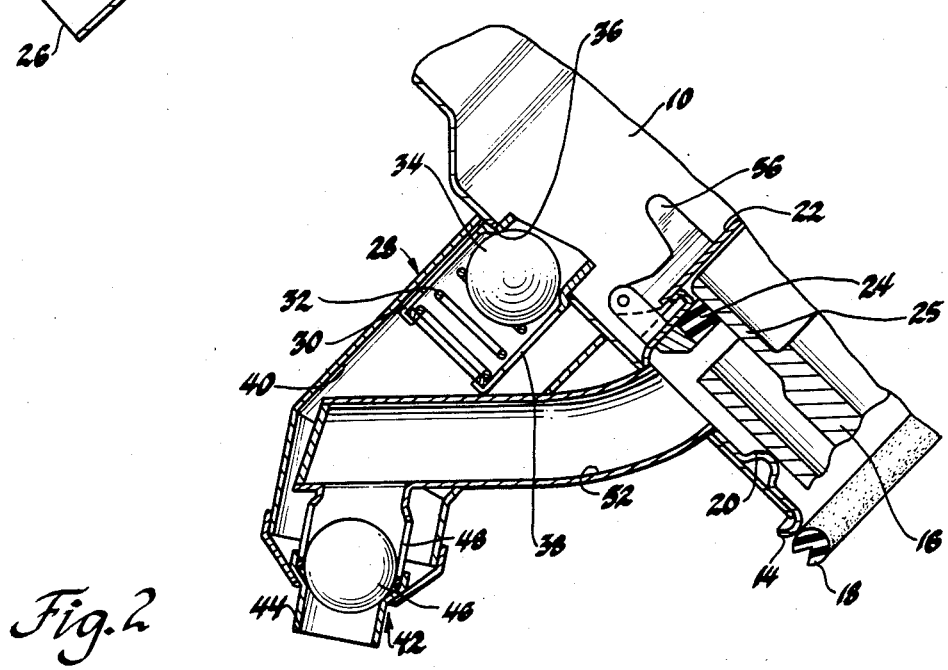
FIG. 2 is a partial elevation showing a portion of the fill tube of FIG. 1 in an abnormal attitude.

The fuel fill tube 10 is shown at an abnormal attitude in FIG. 2. With the fuel cap 16 in place, the seal 24 cooperating with cap extension 25 and shut-off valve 28 prevent fuel in the fuel tank from escaping either to atmosphere or to the charcoal canister. Thus, the fuel tank integrity is maintained.

Figure 5:
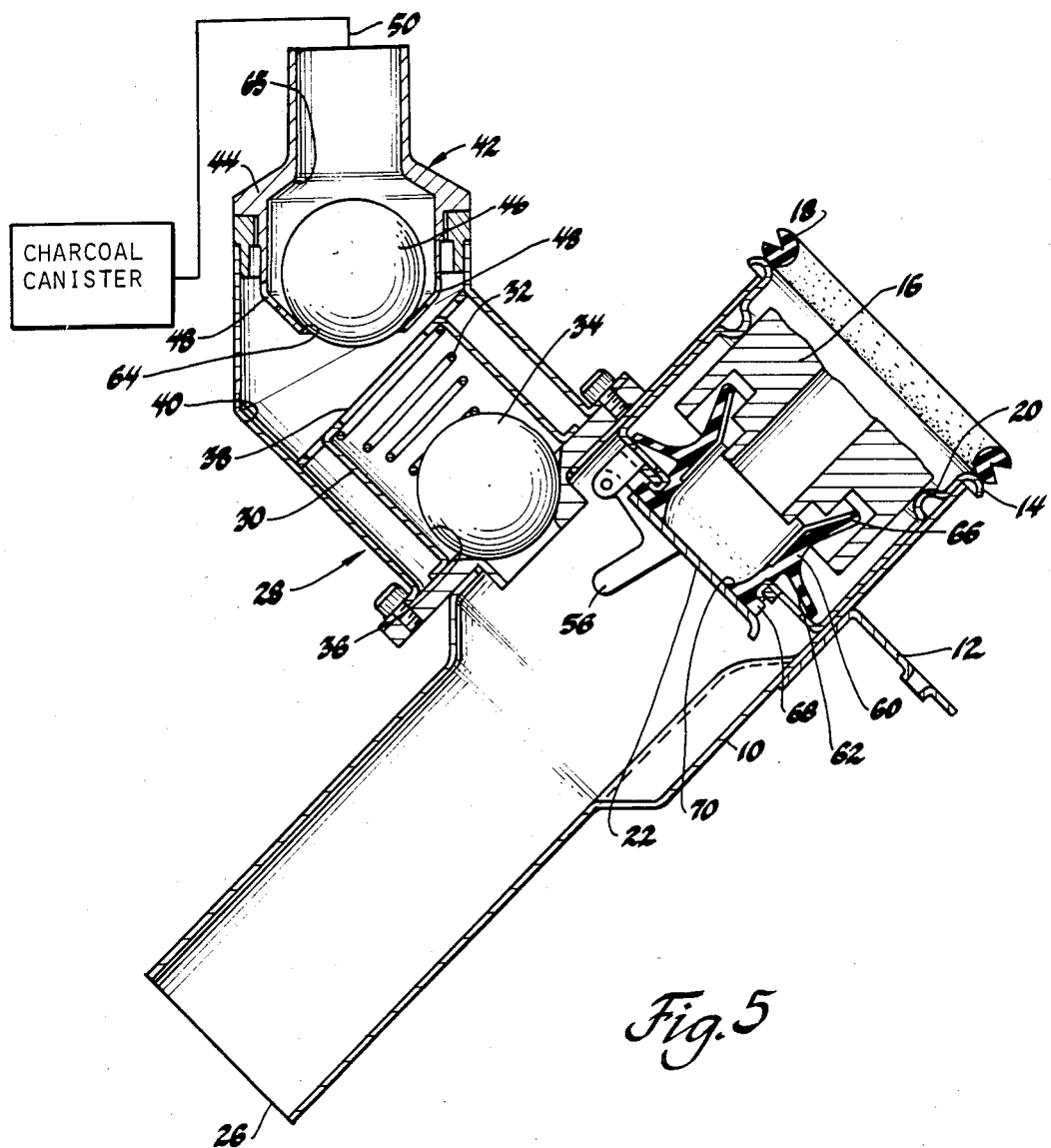
FIG. 5 is a cross-sectional elevational view showing another embodiment of the invention.

The fuel fill tube 10, shown in FIG. 5, incorporates the liquid overfill protection function in a combination seal and valve element 60. The seal and valve element 60 includes a flap 62 which prevents normal communication between the end 26 of fill tube 10 with the inner space of insert 20. However, in the event of inadvertent tank overfill, the ball 46 of valve 42 sealingly engages the housing 44, and liquid pressure in the fill tube 10 causes the flap 62 to lift upwardly thereby relieving the liquid fuel into the insert 20 and to atmosphere. This, again, provides the operator with a warning that fuel overfill is occurring.

The shut-off valve 28 has a slightly different structure in this embodiment. However, its operation and function is identical in that the ball 34 is urged onto the seat 36 by the spring element 32. In this structure, however, the housing 30 has the opening 38 formed in one end thereof which directly communicates with the valve 42. The ball 46 of valve 42 rests on a seat 64 formed in the housing 44. The presence of liquid will move the ball 46 from the seat 64 to seat 65 to close the passage 50 in a manner similar to that described in FIG. 4. Fuel vapors will pass through passages 48 and communicate with the charcoal canister.

The seal 60 has an upwardly extending conical portion 66 which is adapted to guide the fuel nozzle when it is installed in the fill tube. The seal 60 also has an annular portion 68 which provides a flat seating surface for the spring flap 22 and a lip sealing surface 70 for the fill nozzle when it is inserted into the fuel tank. The structure of FIG. 5 is somewhat less complicated than the structure of FIG. 1 in that the interconnecting passage 52 is not necessary in FIG. 5.

It will be appreciated, however, that both structures provide very efficient vapor handing on fuel refilling. These structures do not require vapor communication at the fuel fill nozzle which many of the previous fill tube structures rely on. The present structures also prevent the communication of liquid fuel with the charcoal canister. As is well-known, it is desirable to prevent liquid fuel from reaching the charcoal canister.

The structure of FIG. 5 will also provide protection against liquid fuel from reaching the charcoal canister when an abnormal attitude is assumed by the fuel fill tube. It is conceivable that a vehicle parked on a steep grade with a full fuel tank could permit liquid fuel to reach the canister. The present invention prevents such an occurrence through the shut-off valve 28.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fuel tank fill tube for a vehicle having a fuel tank and a vapor storage canister; said fill tube comprising: an open end adapted to be closed with a fuel cap; a spring closed flap means adjacent said open end for closing said open end from said fuel tank when a cap is installed and being opened by a fuel fill nozzle when refueling of the tank is undertaken, said flap means including a finger portion; spring loaded shut-off means disposed in said fill tube for closing said tube from said canister and being opened by abutment of said finger portion when said flap means is opened; and float valve means for permitting passage of vapor from said tube passing through said shut-off valve to said canister and preventing liquid from flowing to said canister and including overflow means for directing liquid flowing through said shut-off valve to the open end of said fill tube.

2. A fuel tank fill tube for a vehicle having a fuel tank and a vapor storage canister with canister passage means; said fill tube comprising: an open end adapted to be closed with a fuel cap; a spring closed flap means adjacent said open end for closing said open end from said fuel tank when a cap is installed and being opened by a fuel fill nozzle when refueling of the tank is undertaken, said flap means including a finger portion; spring loaded shut-off valve means disposed in said fill tube for closing said tube from said canister passage means and being opened by abutment of said finger portion when said flap means is opened; floating ball valve means for permitting passage of vapor from said tube passing through said shut-off valve to said canister and preventing liquid from flowing to said canister; and overflow passage means for directing liquid flowing from the fuel tank to the open end of said fill tube.

3. A fuel tank fill tube for a vehicle having a fuel tank and a vapor storage canister with canister passage means; said fill tube comprising: an open end adapted to be closed with a fuel cap; a spring closed flap means adjacent said open end for closing said open end from said fuel tank when a cap is installed and being opened by a fuel fill nozzle when refueling of the tank is undertaken, said flap means including a finger portion; spring loaded shut-off valve means disposed in said fill tube for closing said tube from said canister passage means and being opened by abutment of said finger portion when said flap means is opened; floating ball valve means for permitting passage of vapor from said tube passing through said shut-off valve to said canister and preventing liquid from flowing to said canister; and seal means disposed adjacent said flap means for sealing said fuel fill nozzle during refill and including a lip portion movable in response to liquid overfill to vent the overfill to atmosphere.

* * * * *

UNITED STATES PATENT AND TRADEMARK OFFICE
CERTIFICATE OF CORRECTION

PATENT NO. : 4,630,749

DATED : December 23, 1986

INVENTOR(S) : Armstrong et al.

It is certified that error appears in the above-identified patent and that said Letters Patent is hereby corrected as shown below:

Title page, Column 1, change "Donald J. Armstrong, Troy; Roy A. Giacomazzi, Washington Township, Macomb County; George W. Niepoth, Milford, all of Mich." to read
-- Donald J. Armstrong, Troy; Roy A. Giacomazzi, Rochester Hills; George W. Niepoth, Milford, -- and add -- Rolland D. Giampa, Clarkston, all of Mich. --.

Signed and Sealed this

Fifth Day of June, 1990

Attest:

HARRY F. MANBECK, JR.

*Attesting Officer*      *Commissioner of Patents and Trademarks*